Patented Aug. 29, 1944

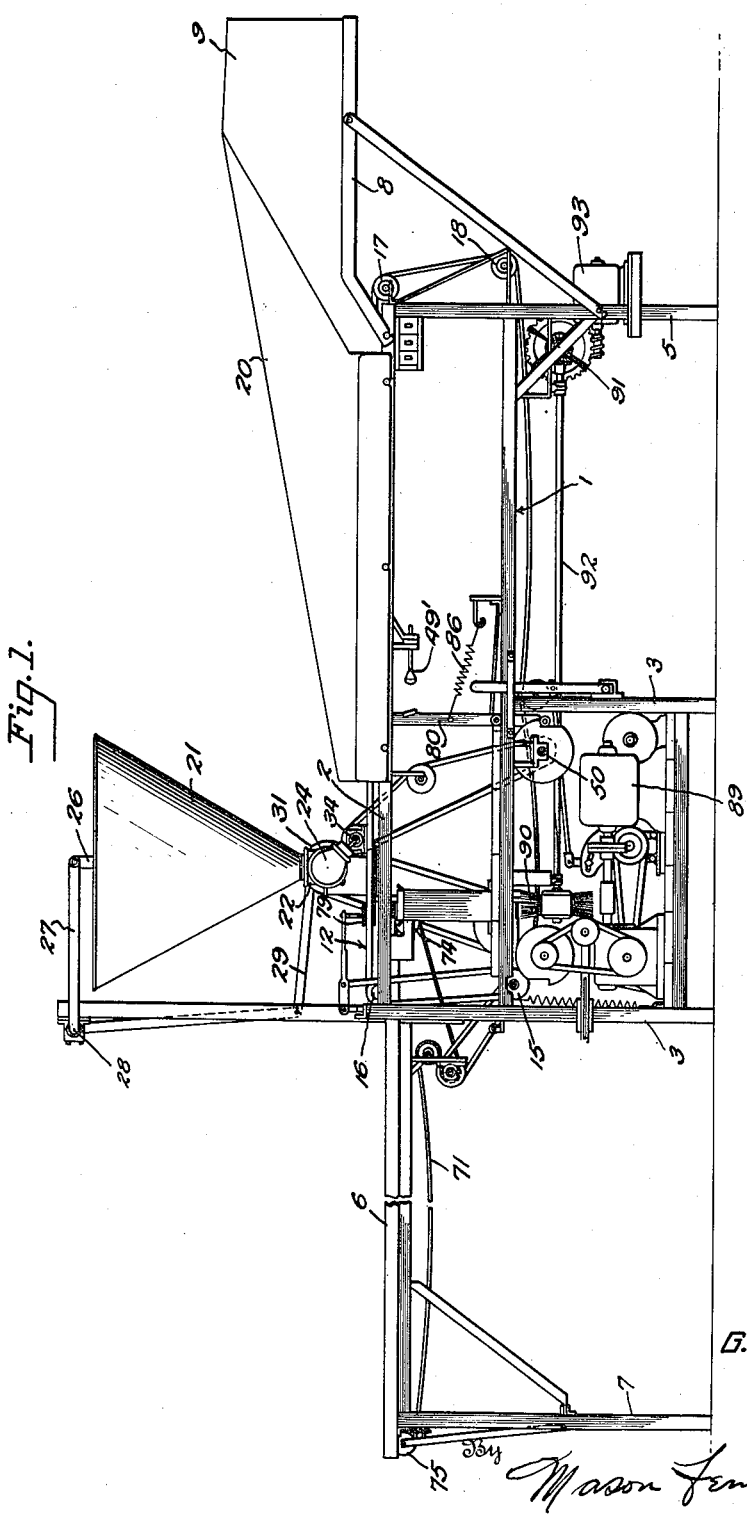

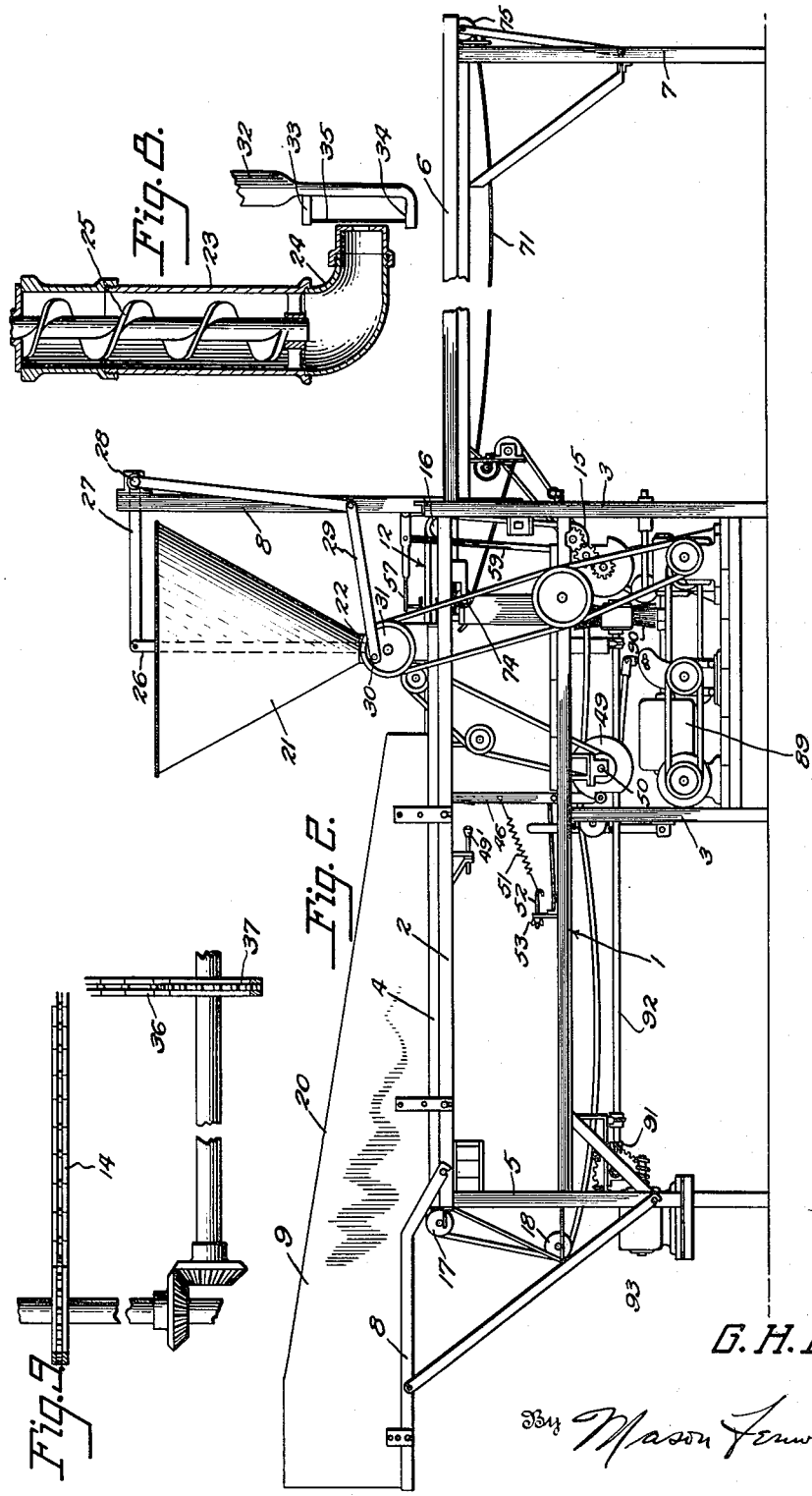

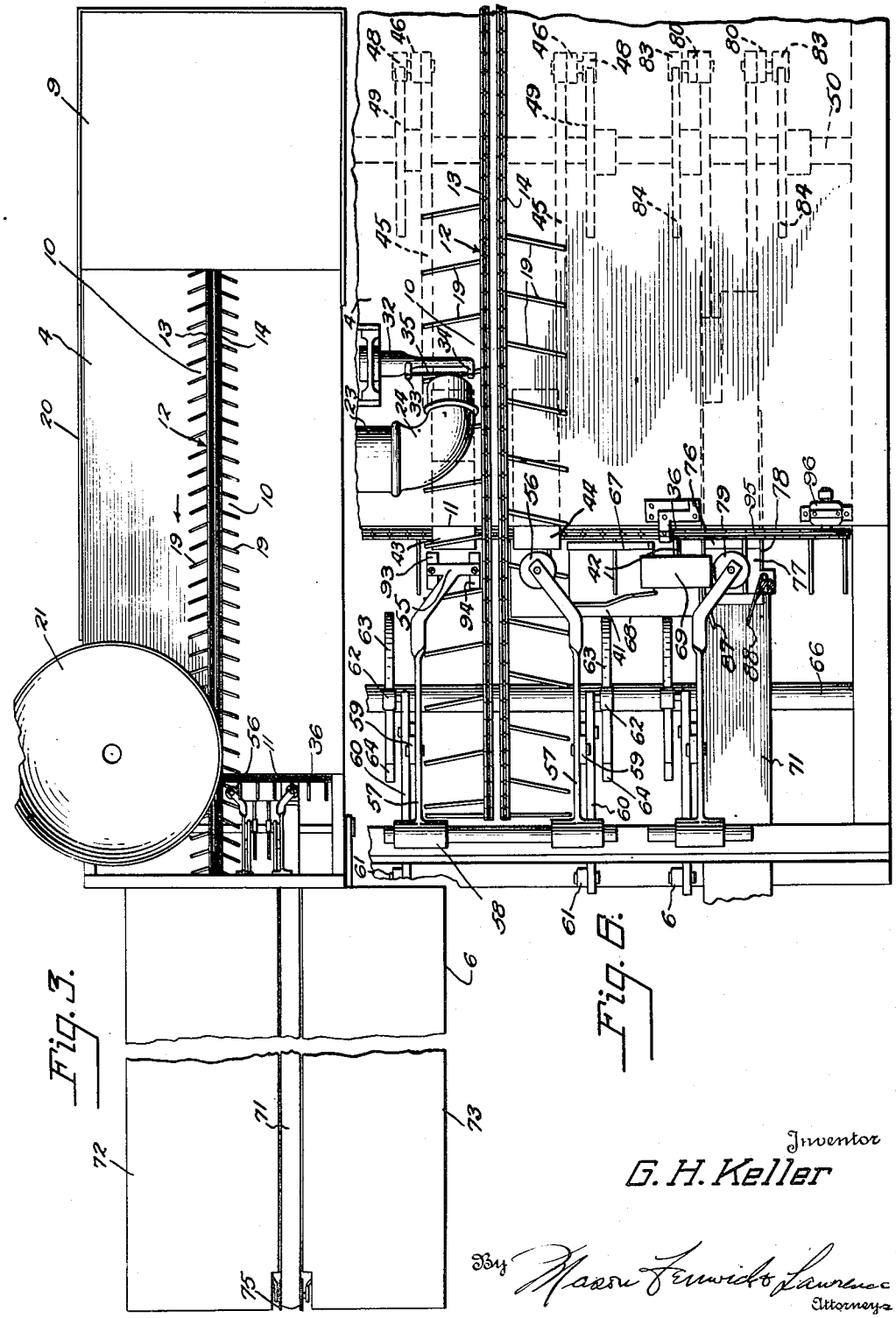

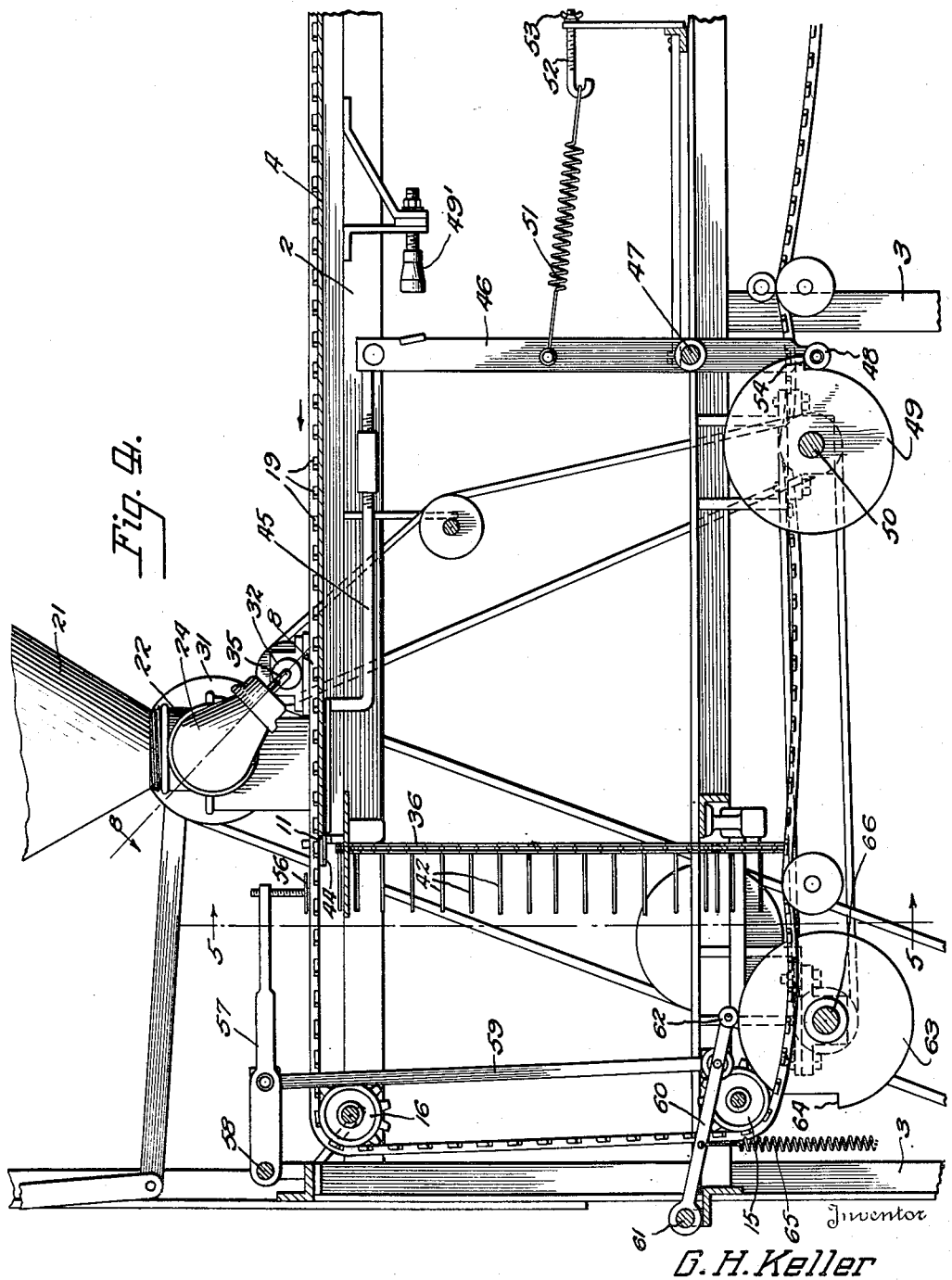

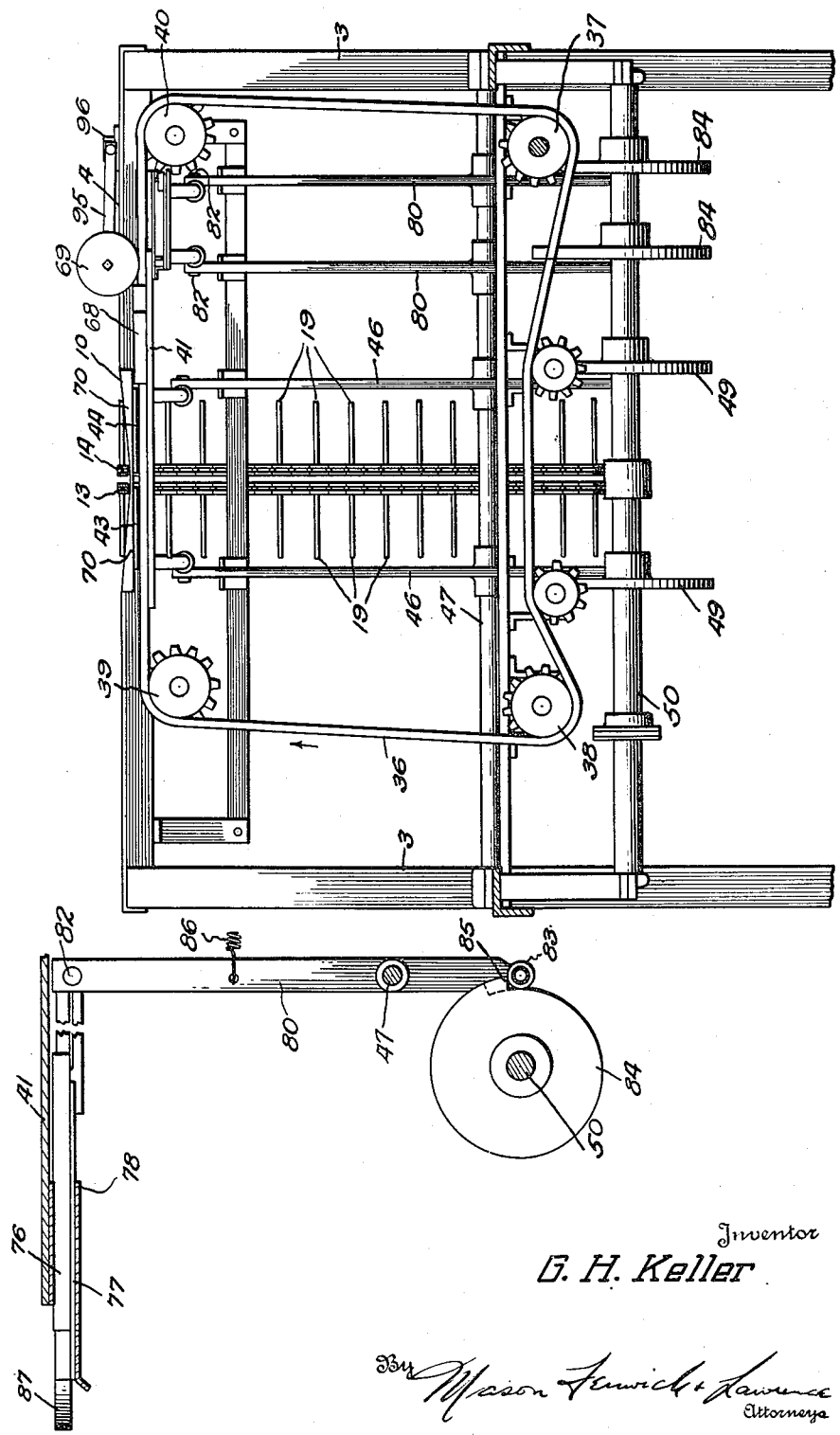

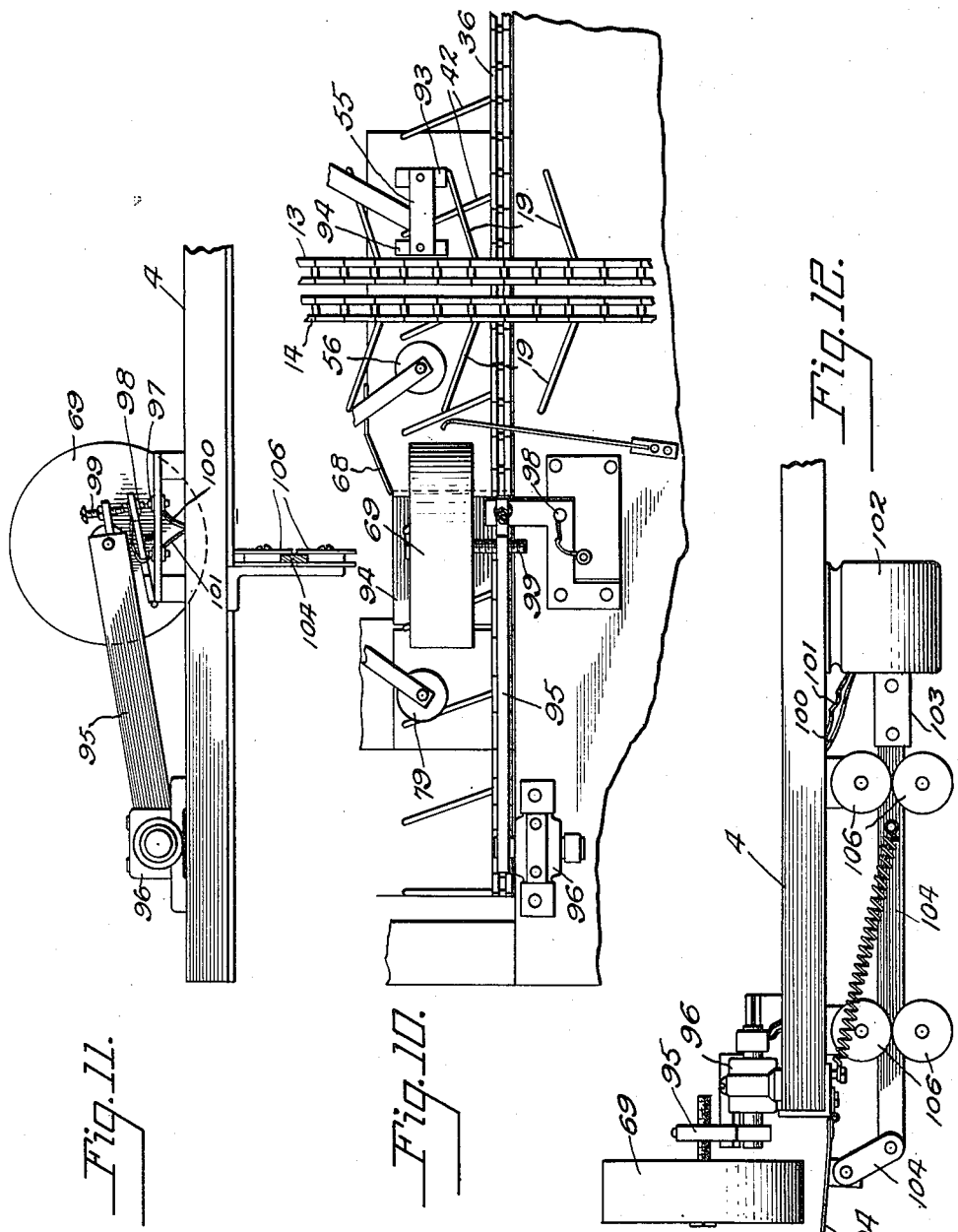

2,356,853

UNITED STATES PATENT OFFICE 2,356,853

SANDWICH MAKING MACHINE

Gregory Harding Keller, Helena, Ark., assignor of fifty per cent to Robert E. McCormack, Albany, Ga.

Application July 24, 1942, Serial No. 452,238

11 Claims. (Cl. 107—1)

This invention relates to a machine for making sandwiches of the type which comprise upper and lower wafers with plastic filling therebetween.

The general object of the invention is to provide a machine which performs the following operations:

(a) Conveying wafers in two adjacent parallel rows from a region adjacent a supply of wafers to a station at which the sandwich is built up.

(b) Depositing a unit quantity of the plastic filling on each wafer of one row while enroute from said supply region to said sandwich building station.

(c) At the end of the rows of wafers, dropping a wafer having the filling below the level of the wafer without the filling.

(d) Moving the dropped wafer to a position in front of the row of wafers without the filling.

(e) Dropping a wafer without the filling on top of the wafer having the filling, thus building up the sandwich.

(f) Aligning the wafers of the sandwich to bring them into vertical registry.

(g) Pressing the sandwich to flatten and distribute the filling.

(h) Moving the completed sandwich to a conveyor, dropping it on to said conveyor, and conveying the completed sandwiches in a row in juxtaposition to a wrapping table.

Other objects of the invention reside in the combination and subcombination of elements, and the structure of the elements themselves, which coact in the performance of the functions.

In the drawings:

Figure 1 is a view in elevation, of one side of a sandwich machine embodying the principles of the invention;

Figure 2 is a similar view of the other side;

Figure 3 is a plan view, parts being broken away;

Figure 4 is a longitudinal vertical section through a portion of the machine;

Figure 5 is a transverse vertical section taken along the line 5—5 of Figure 4;

Figure 6 is a plan view on an enlarged scale, of the middle portion of the machine, parts being broken away;

Figure 7 is a vertical section through the transfer means which drops completed sandwiches onto the conveyor which takes them to a wrapping table;

Figure 8 is a detail view showing the filling hopper discharging mechanism and the filling cutter;

Figure 9 is a detail view showing the correlated drive for the main and cross conveyor chain;

Figure 10 is a fragmentary plan view illustrating the rejector mechanism for disposing of uncompleted sandwiches;

Figure 11 is a side elevation of the roller actuated rejector switch;

Figure 12 is an end elevation of a portion of the machine showing the solenoid controlled rejector plate.

Referring now in detail to the several figures, and first adverting to the assembly views, Figures 1 and 2, the reference character 1 represents the machine as a whole, comprising a horizontal frame 2 having vertical supports 3. The central part of the frame carries most of the operating mechanism. At the one end is a feeding table 4, supported by vertical standards 5, while at the other is a wrapping table 6 supported by the vertical legs 7. A hopper support 8 is detachably connected to the machine at the outer end of the feeding table 4, a hopper 9 being carried by this support. The hopper 9 is designed to hold a supply of wafers. The inner end of the hopper inclines downwardly toward the feeding table.

A wafer slideway 10 extends longitudinally along the feeding table from the region of the hopper to the opposite end 11 of said table, Figure 3. It will be observed from Figure 5 that the wafer slideway 10 converges slightly downward towards a median longitudinal line so that wafers moved along said slideway will gravitate toward the center line of the slideway.

The main conveyor chain 12 which comprises two parallel identical chain members 13 and 14 moves endlessly in a vertical plane, passing over the sprockets 15, 16, 17 and 18, being driven by the sprocket 15 in the direction indicated by the arrows in Figures 3 and 4. The upper flight of the chain 12 passes longitudinally down the middle of the slideway 10. The chain 12 has a series of spaced vanes 19 extending outwardly from each of its component members 13 and 14 and inclining slightly forwardly in the direction of travel of said chain. The vanes are spaced apart a distance greater than the diameter of a wafer and the outer ends of the vanes contact or move in close proximity to the surface of the slideway 10.

It is contemplated that the hopper shall contain a supply of wafers and that a girl tending the machine shall sweep a number of wafers by means of her hand, onto the table 4 on both sides of the chain 12, and that she shall slide the wafers into the spaces between the vanes on both sides. The convergent shape of the slideway 10 assures that the wafers will gravitate toward the chain and will not work out from between the vanes. The latter act as pushers for moving the wafers along toward the foot of the table.

The illustrated form of my invention shows a backboard 20 which is employed when only one girl is tending the feeding end of the machine, to prevent wafers spilling off the opposite edge of the table. Where two girls are tending the machine, one on each side, the backboard is omitted. The attendant's duty is to see that none of the spaces between the vanes is vacant and the extent of chain moving along the table and the speed at which it moves makes it an easy matter to keep the chain filled, without a vacancy. It will be noted that the vanes on opposite sides of the chain 12 are staggered.

At an intermediate point between the supply hopper 9 and the foot of the table is the filling hopper 21. This is to contain the plastic material which is to form the filling of the sandwich. The filling hopper 21 is preferably funnel shaped, having a narrow throat 22 which debouches into a substantially horizontal tube 23 having a spout end 24 directed inclinedly downwardly above the row of wafers carried by one side of the chain. Only the wafers of one row, therefore, will be supplied with filling. Within the tube 23 is a driven screw conveyor 25, see Figure 8, which advances the plastic material from the hopper to the spout end 24. A reciprocatory ramrod 26, see Figure 2, operates in the throat 22 of the hopper 21 to supply the filling material to the conveyor screw 25. The ramrod 26 is reciprocated by means of a bell crank 27 fulcrumed to a fixed upright at 28 and oscillated by means of a pitman 29 operated by a crank 30 on the belt driven pulley 31.

The filling material is cut into suitably sized units at its point of emergence from the spout end 24 by rotary means shown in Figure 8, which consists of a driven shaft 32 having a pair of lugs 33 and 34 projecting in the same radial plane and bridged by a taut cutting wire 35, the path of revolution of which passes close to the spout end 24. The rate of travel of the chain 12 and revolution of the cutting wire 35 are so timed that a unit mass of filling material falls upon each wafer as it passes beneath the spout end 24.

The chain 12 continues beyond the end of the table 4, the wafer slideway 10 forming the bottom of the conveyor, so that when the wafers reach the end of the table, they will fall through.

At the foot of the table a cross conveyor chain 36 is provided, which revolves endlessly about the four sprockets 37, 38, 39 and 40, Figure 5, the sprocket 37 being driven. The cross chain travels in the direction indicated by the arrow. The upper flight of the cross chain travels over a plate 41 which forms the bottom of the conveyor. The cross chain 36 is provided with a series of parallel vanes 42 extending from one side only, and spaced apart a distance greater than the diameter of the wafers.

It will not do for the wafers to fall uncontrolled from the longitudinal conveyor to the cross conveyor, for they would tilt in doing so and land upon the cross conveyor in a more or less desultory manner. Provision is made to assure that the wafers shall land flat upon the cross conveyor. This provision consists of a pair of snap-backs 43 and 44 shown in plan in Figure 6, in end elevation in Figure 5 and one of which is shown in side elevation in Figure 4. These snap-backs each comprise a flat horizontal plate adapted in one position to project beyond the foot of the table and lying close thereto to receive the wafers which are pushed off of the table by the vanes 19 and which plates, having received the wafers, are suddenly retracted to a position beneath the table, leaving the wafers unsupported, scraping them against the vane 19, permitting them to fall flat upon the cross chain conveyor track. Both of these snap-backs are operated by identical means which, as shown in Figure 4, comprises an operating arm 45 connected to the snap-back plate and pivotally connected to a rocking lever 46, which in turn is pivotally connected at an intermediate point 47 to a fixed part of the lever, the opposite end of the rocking lever having a roller 48 which bears against a cam 49 carried by the driven shaft 50. The rocking lever is biased in a direction to press against said cam by a spring 51, the tension of which spring may be adjusted by means of the threaded spring anchor 52 and wing nut 53. The perimeter of the cam 49 is so spiralled that as the cam turns it pushes the roller 48 and the rocking lever 46 outwardly in respect to the center of the cam, until it reaches the end of the spiral at the shoulder 54. As the roller 48 is bearing against the spiralled perimeter of the cam the outward motion imparted to the rocking lever 46 causes a forward motion of the snap-back 44, which is thus caused to move at the same speed as the chain 12. This snap-back conveys the wafer that the vane of the conveyor chain 12 is pushing off the end of the slideway 10 when and as it is pushed off. When the rocking lever 46 drops off the shoulder of the cam, the snap-back plate is suddenly withdrawn by the pull of the spring 51, leaving the wafer unsupported. When the snap-back is so retracted, the vane of the conveyor chain that has been pushing the wafer acts as a scraper, preventing the wafer from moving back with the snap-back. The snap-back 44 in its retracted position is entirely underneath the slideway 10. Immediately after its retraction it starts its forward motion again, conveying the wafer that the next vane of the conveyor chain is pushing off the edge of the slideway 10. The two snap-backs do not operate in the same phase, their operating cams being displaced upon the shaft 50 so that the snap-back plate 43 which receives a wafer with filling, drops that wafer upon the cross chain conveyor before a wafer without filling is dropped. When released by the cam 49, the rocking lever comes to a stop against the adjustable yielding buffer 49′, one of which may be provided for the rocking lever of each of the snap-backs present in this machine.

The staggered relation of the vanes 19 of the longitudinal conveyor chain 12 is for the purpose of delivering a wafer with filling to the snap-back 43 in advance of the delivery of a wafer without filling to the adjacent snap-back plate 44.

Inasmuch as certain sandwich fillings may be of sticky consistency, which might gum the vanes 19 of the main conveyor chain and probably cause wafers to stick and not drop when they are moved beyond the foot of the table, positive means are provided for pushing the wafers downwardly from between the vanes 19 upon the cross chain track after the snap-back plates 43 and 44, respectively, have snapped back. These means, hereinafter referred to as depressors, are shown in plan in Figure 6 at 55 and 56, respectively. The depressor 55 which comes down upon the wafer with filling has spaced contact pieces 93 and 94 which straddle the filling pressing upon the marginal portions of the wafer. The depressor 56 which comes down upon the wafer without filling is preferably of circular nature. These depressors are operated by identical means shown in plan in Figure 6 and one of which is shown in side elevation in Figure 4, comprising an oscillating lever 57 to which the depressor is preferably adjustably secured, said lever being pivoted at the end opposite the depressor to a fixed part of the machine as indicated at 58, and having a pitman 59 pivotally connected thereto at an intermediate point, the opposite end of said pitman being connected to an intermediate point of a rocking lever 60 having one end pivotally connected to a fixed part of the machine at 61, and the opposite end carrying a roller 62 which operates against a cam 63. This cam has an abrupt shoulder 64 causing an abrupt drop of the rocking lever 60 when it falls from said shoulder. The rocking lever 60 is kept pressed against the cam by a spring 65. Normally the depressors 55 and 56 are in elevated position, but when the rocking lever 60 drops from the shoulders 64 of the cams 63 the depressors suddenly come down upon the respective wafers, depositing them upon the cross chain track. The cams 63 are so displaced upon the driven shaft 66, that the depressors 55 and 56 descend almost immediately after the snapbacks 43 and 44, respectively, withdraw.

The cross chain conveyor 36 is so timed with respect to the main chain conveyor 12 that it receives wafers from the snap-back plates in the successive spaces between the vanes 42 and the speeds of travel of said conveyor are such that a wafer with filling, dropped by the snap-back plate 43 upon the cross chain will travel beneath the snap-back plate 44 and receive in superposed position, the wafer without filling dropped upon it by the snap-back plate 44. Thus, the sandwich is built up. The cross chain with the tiered sandwich then travels past aligning means comprising a fixed ledge at one side of the path of travel of the sandwich and a resilient finger 68 on the opposite side, the space between which means is slightly narrower than the diameter of a wafer, so that the resilient finger 68 pushes against the tiered wafers, shifting them into a position of congruency if they are out of lateral alignment. The pressure of the vanes 42 against the tiered wafers aligns them in the direction of their travel.

The cross chain then carries the tiered sandwich beneath a roller 69 having sufficient weight which flattens the sandwich, spreading the filling and sticking the two wafers together through the intermediary of said filling.

The roller 69 overlies a hinged extension 94 of the plate 41, which plate together with said extension forms the bottom of the cross conveyor so that when the sandwich emerges from beneath the roller it is ready to be dropped upon the wrapping conveyor 71, Figures 3 and 6 particularly, which is a belt traveling between the wrapping tables 72 and 73 and at the same level as said tables.

In addition to its normal function of pressing the completed sandwich to uniform thickness, thereby distributing the filling between the wafers, the roller 69 is instrumental in actuating a rejector which disposes of uncompleted sandwiches, that is, sandwiches which occasionally come to the region of the roller with the top wafer missing.

The roller 69 is at the end of the lever 95 oscillatably journaled in a fixed bearing 96. The roller is lifted by the passage of a vane 42 beneath it. When the vane 42 has passed, the roller comes down upon the adjacent sandwich, pressing the wafers to reduce the sandwich to a determined thickness and spreads the filling. Figure 11 shows the roller 69 at the height which determines the sandwich of proper thickness. A switch represented by the normally separated respective fixed and movable contacts 97 and 98 is mounted beneath the lever 95 and is operated by an adjusting screw 99 carried by said lever. When the roller is at a height determined by the passage beneath it of one of the vanes 42, or when it is at the height shown in Figure 11, being supported by a completed sandwich, the screw 99 is out of touch with the movable switch contact 98. When an uncompleted sandwich comes beneath the roller 69, the latter falls to a lower level, causing the screw 99 to close the switch. The latter is in a circuit represented by the wires 100 and 101 which energizes a solenoid 102 (Figure 12). The armature 103 of this solenoid is connected to a rod 104, which in turn connects with the hinged extension 94 by a link 105. The rod 104 is supported between spaced pairs of guide rollers 106. When the solenoid is energized, the rod 104 is pulled to the right, viewed in Figure 1, dumping the hinged extension 94, thus disposing of the uncompleted sandwich carried by said plate.

The wrapping conveyor 71 travels between the forward and rearward pulleys 74 and 75, respectively. The completed sandwich which is, of course, more than twice as high as the thickness of a single wafer, cannot be merely let fall off of the plate 41 upon the wrapping conveyor 71, for it is apt to upset or land inaccurately. It must therefore be dropped flat, necessitating the provision of a pair of snap-backs 76 and 77, which operate in superposed position beyond the end of the plate 41. These snap-backs are carried in a track device 78 fixedly mounted. The upper snap-back has a thickness at least equal to that of the tiered sandwich so that when the sandwich has been deposited by the snap-back 76 upon the snap-back 77, it will be below the vanes 42 of the cross chain conveyor 36. The upper surface of the snap-back 76 is just below the level of the plate 41 and forms substantially a continuation of said plate. The sandwich is pushed upon the upper snap-back by the cross vanes 42. Just when the sandwich reaches the center of the upper snap-back, the latter suddenly retracts beneath the table, dropping the sandwich to the lower snap-back 77. The descent of the sandwich is assured by means of the depressor 79, best shown in Figure 6. As soon as the sandwich lands upon the snap-back 77, the snap-back 76, which has just retracted, moves forwardly, pushing with its front edge the sandwich. When the front edge of the sandwich reaches the edge of the track device 78, the lower snap-back 77, upon which the sandwich is sliding, moves forward at the same speed as the upper snap-back 76, and the sandwich is no longer sliding upon it but is being carried by it. The snap-back 77 carries the sandwich completely beyond the edge of the track 78 and over the wrapping conveyor 71. When the sandwich is completely over the wrapping conveyor and the edge of the upper snap-back 76 has reached the edge of the track 78, snap-back 77 retracts, dropping the sandwich upon the conveyor 71, the front edge of the upper snap-back 76 acting as a scraping abutment, preventing the sandwich from moving back with the lower snap-back.

The two snap-backs are actuated by means similar to those which actuate the snap-back plates 43 and 44, previously described. The means for one of the snap-backs 76, 77 is shown in Figure 7, comprising the rocking lever 80 pivoted at an intermediate point 81, having its upper end pivotally connected to the snap-back 76 at the point 82, and having its lower end carrying a roller 83 which presses against a cam 84 carried by the driven shaft 50. A spring 86 keeps the rocking lever pressed against the cam 84 and causes the snap-back to suddenly retract when the roller 83 falls off of the shoulder 85 of said cam.

The cams are angularly displaced on the shaft 50 so that the upper snap-back retracts while the lower snap-back is already in its retracted position beneath the upper snap-back. The upper snap-back starts its forward motion almost immediately after its retraction and while the lower snap-back is motionless. This causes the upper snap-back to engage the sandwich and give it a kick forward on the lower snap-back. To prevent the sandwich from unduly shifting under such a blow, a retarding device is provided, comprising a pair of convergent springs 87 and 88 at the sides of the track device 78, which engages the sides of the sandwich acting as a brake upon its forward motion. As the upper snap-back 76 advances between these springs, it progressively spreads them, the sandwiches progress in a row onto the wrapping conveyor 71 between the tables 72 and 73 from which they are taken by girls sitting at the sides of the table, and manually wrapped.

A motor 89, through suitable connections which are common to machines generally, and which it does not seem necessary here to describe in detail, drives the several operating instrumentalities of the machine, with the exception of the brushes 90 and 91, which respectively clean the cross chain conveyor and the main conveyor. These brushes are connected to a shaft 92 mounted in suitable bearings and driven by gearing from a separate motor 93.

While I have in the above description disclosed what I believe to be preferred and practical embodiment of the invention, it will be understood to those skilled in the art that the specific details of construction and arrangement of parts are by way of illustration and not to be construed as limiting the scope of the invention which is defined in the appended claims.

What I claim as my invention is:

1. In a machine for making sandwiches from superposed wafers with an intermediate filling of a plastic material, a feeding table, means to form parallel continuously moving wafer feed conveyors on said table, means to supply filling positioned over one of said feed conveyors, means to form a transverse continuously moving assembly conveyor underlying said feed conveyors beyond the end of said feeding table, means underlying each of said feed conveyors projectable over said assembly conveyor to form extensions to said feeding table, and means operated in synchronism to said feed and assembly conveyors to retract said extensions to permit a wafer with filling to drop flat upon said assembly conveyor and to permit a wafer without filling to drop flat upon the wafer with filling, whereby a sandwich may be completed while the assembly conveyor and feed conveyers are in motion.

2. In a sandwich making machine as claimed in claim 1, said means to form continuously moving wafer feed conveyors comprising two parallel chains, and spaced vanes on each chain for pushing wafers, said vanes being slightly inclined forwardly.

3. In a sandwich making machine as claimed in claim 1, said means to form continuously moving wafer feed conveyors comprising two parallel chains, and spaced vanes on each chain for pushing wafers, said vanes being slightly inclined forwardly, and said feeding table having a longitudinal depression forming a track for said feed chains, the sides of said depression diverging upwardly and outwardly to the plane of the table.

4. In a sandwich making machine as claimed in claim 1, said means to supply filling comprising a hopper having a restricted outlet, a continuously revolving wire cutter passing adjacent said outlet and said feed conveyor, whereby sections of the plastic material emerging from said outlet will be cut off and laid upon a wafer passing beneath said outlet.

5. In a sandwich making machine as claimed in claim 1, means associated with said transverse assembly conveyor yieldingly narrowing the sandwich path, whereby the wafers of said sandwich are aligned in substantial congruency while the sandwich is in motion.

6. In a sandwich making machine as claimed in claim 1, a yielding roller adapted to press upon the sandwiches as they pass thereunder on the transverse assembly conveyor, whereby the filling between the wafers is distributed and wafers are caused to adhere to the filling.

7. In a sandwich making machine as claimed in claim 1, independently operated depressors adapted to contact from above the wafers on said retractable means after the time of retraction of said means, thereby supplementing gravitation in depositing said wafers on the transverse assembly conveyor.

8. In a sandwich making machine as claimed in claim 1, said transverse assembly conveyor extending beyond said sandwich building station and having an underlying plate with a hinged extension, a yielding roller above said hinged extension adapted to be gravitationally supported by completed sandwiches passing thereunder upon said hinged extension and to press these to determined thickness, means normally supporting said extension at the level of said plate and and means actuated through the dropping of said roller towards an incompleted sandwich on said extension for releasing said supporting means and dropping said uncompleted sandwich.

9. In a machine for making sandwiches from superposed wafers with an intermediate filling of a plastic material, a table, a wafer conveyor on said table and continuing beyond the edge thereof, a transverse conveyor beneath said wafer conveyor, means underlying said wafer conveyor projectable over said transverse conveyor to form an extension to said table, and means to retract said extensions.

10. In a machine for making sandwiches from superposed wafers with an intermediate filling of a plastic material, a wafer conveyor, a filling hopper having a restricted outlet, and a revolving wire cutter passing adjacent said outlet and said conveyor, whereby sections of the plastic filling emerging from said outlet will be cut off and laid upon a wafer passing beneath said outlet.

11. In a machine for making sandwiches from superposed wafers with an intermediate filling of a plastic material, a hopper into which loose wafers may be dumped, a table, and means to form a row of wafers on said table comprising a chain and spaced vanes on said chain, said chain emerging from said hopper and extending across said table.

GREGORY HARDING KELLER.